Sept. 1, 1953  K. T. PARSELL  2,650,701
SPECTACLE CASE
Filed Dec. 18, 1951
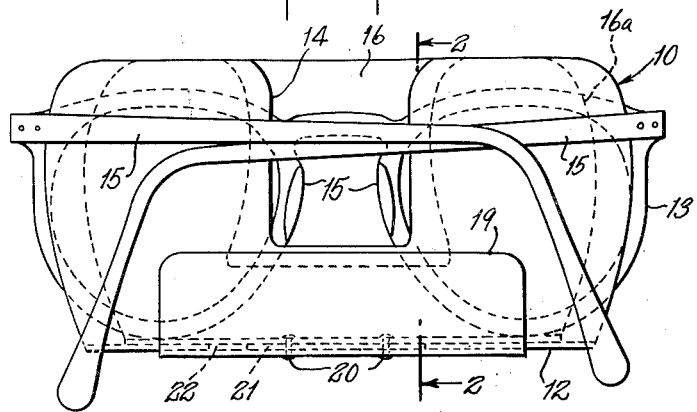
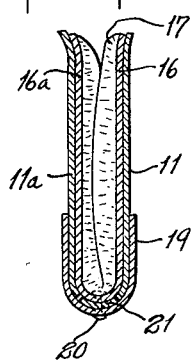
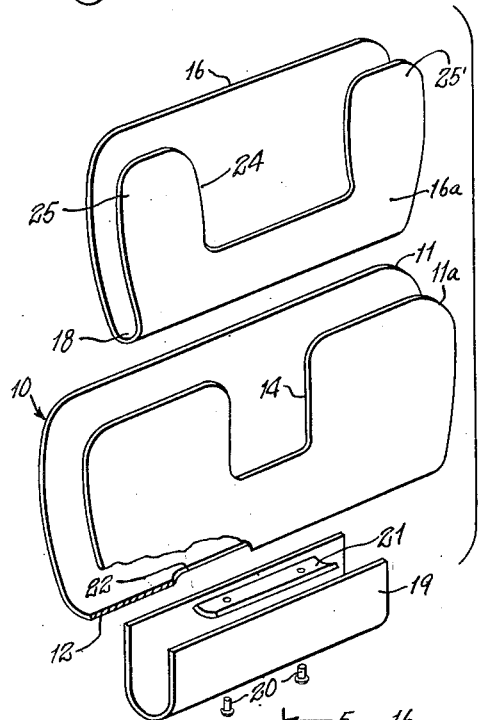
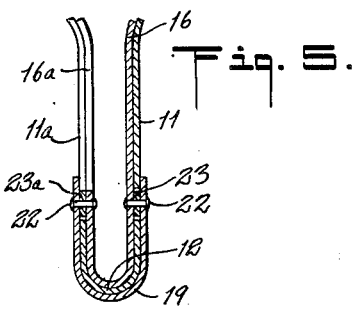
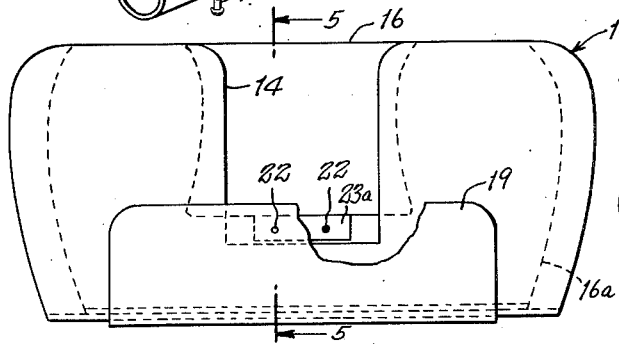
INVENTOR.
KENDRICK T. PARSELL
BY
Kenyon + Kenyon
HIS ATTORNEYS Patented Sept. 1, 1953

2,650,701

UNITED STATES PATENT OFFICE 2,650,701

SPECTACLE CASE

Kendrick T. Parsell, Manhasset, N. Y.

Application December 18, 1951, Serial No. 262,262

4 Claims. (Cl. 206—5)

This invention relates to spectacle cases.

It is an object of this invention to provide a spectacle case equipped with means for cleaning the lenses of spectacles carried therein.

It is a further object of this invention to provide such a spectacle case which also affords effective protection for spectacles when not in use.

Conventional spectacle cases merely provide a container in which spectacles may be inserted when not in use. As so contained the lenses of the spectacles are apt to accumulate dust or lint and may otherwise have become soiled so as to require cleaning of the lenses when the spectacles are to be used again. Usually this cleaning is accomplished by use of a handkerchief or a special cleaning paper prepared for the purpose. However, such cleaning when the spectacles are to be used again is a nuisance and frequently there is no suitable cleaning material available for the purpose.

There have been certain proposals for providing spectacle cases equipped with means for cleaning the lenses of spectacles carried therein. Some such proposals involve the employment of soft flexible cases whereby, by manipulation of the flexible material of the spectacle case from the outside, one can rub cleaning material against the lenses so as to accomplish a certain amount of cleaning. However, any such spectacle case, to be of utility in permitting cleaning of the spectacles lenses, inherently is flimsy and does not provide good protection for the spectacles. Spectacle cases are frequently carried in the pocket and when a spectacle case is of such flimsy construction breakage of the spectacles is very likely to occur due to pressure against the spectacle case as, for example, the result of sitting on the spectacle case or leaning against an object.

Spectacle cases which are of greater strength and rigidity have been proposed which are equipped with means for cleaning the spectacle lenses, but the arrangements proposed have been both clumsy and of such intricacy of construction as to render them impractical either for use or for commercial manufacture and sale.

Accordingly it is a further object of this invention to provide a spectacle case of rigid or semi-rigid construction for affording highly effective protection for spectacles contained therein and at the same time to equip the spectacle case with simple but highly effective means for cleaning the lenses of spectacles carried therein, the spectacle case being capable of ready and economical manufacture and being convenient to use.

For obtaining the foregoing objectives and advantages, features of this invention relate to the provision of a protective envelope member in combination with lens cleaning elements and actuating means as described and exemplified hereinbelow in connection with the accompanying drawings, wherein Fig. 1 is a plan view of a spectacle case embodying this invention and showing the position of spectacles as carried therein;

Fig. 2 is a section taken on the line 2—2 of Fig. 1;

Fig. 3 is an exploded view showing in perspective the parts comprised in the spectacle case of Figs. 1 and 2;

Fig. 4 is a plan view of an alternative embodiment of the invention; and

Fig. 5 is a section taken on the line 5—5 of Fig. 4.

Referring to the embodiment shown in Figs. 1 to 3, the spectacle case comprises the envelope member which is indicated generally by the reference character 10 and which comprises the bottom and top lens protecting portions 11 and 11a, respectively, that are closed and joined together by the marginal portion 12. In the embodiment shown the preferred construction is shown wherein the lens protecting portions are constituted from an integral sheet of suitable material. The sheet material which is used is one that affords substantial and effective resistance to deformation and which provides strength appropriate so that the marginal portion 12 will maintain the lens protecting portions in spaced apart relation as shown. The longitudinal margin of the envelope member that is opposite to the closed marginal portion 12 is left open so that a spectacle frame 13 may be inserted therebetween as shown in Fig. 1. The lens protecting portion 11a of the envelope member has the recess 14 therein for accommodating the nose rest portion 15 of the spectacle frame when the spectacle frame is inserted in the envelope member. Preferably the longitudinal extent of at least the lens protecting member 11a is approximately the same as the normal spacing of the inner surfaces of the temples 15 where they are hingedly attached at the ends of the spectacle frame, thus permitting the temples to be folded over the upper surface of the lens protecting member 11a as shown in Fig. 1. It may also be noted that when the spectacle frame is thus inserted in the envelope member, it is prevented from substantial longitudinal movement relative to the envelope member.

Within the envelope member there are disposed the lens cleaning elements 16 and 16a whose opposing surfaces present a suitable lens cleaning material 17. Any suitable means may be provided for maintaining the lens cleaning elements 16 and 16a in opposed spaced relation with the cleaning material 17 presented thereby in light pressure contact with the lenses of a spectacle frame inserted therein. In the embodiment shown such spacing means is provided by making the lens cleaning elements 16 and 16a integral with the curved marginal part 18. Conveniently as shown a single piece of sheet metal or plastic may be used which is of sufficient strength to hold the lens cleaning elements in desired position while permitting a limited amount of resilient flexure to permit slight spreading apart of the lens cleaning elements 16 and 16a when a spectacle frame is inserted therebetween. These comments are also applicable to the marginal portion 12 of the envelope member 10. In other words both the lens protecting portions 11 and 11a and the lens cleaning elements 16 and 16a are maintained in desired position for receiving the spectacle frame and while the compressibility of the lens cleaning material can readily be such as to permit the entry of the spectacle frame therebetween, a certain amount of resilient give is preferable to facilitate the entry of the spectacle frame. Moreover, by providing some degree of resilient flexibility moderate pressure applied to the envelope member can be employed to increase the pressure of the lens cleaning elements against the lenses of the inserted spectacle frame.

In the embodiment shown at least the lens cleaning element 16a contains the recess 24 for accommodating the nose rest portion of the inserted spectacle frame leaving the finger-like portions 25 and 25' whose margins are dimensioned and curved as shown so as to permit their being moved substantially longitudinally with respect to the envelope member without striking the temples or the nose rest of the spectacle frame while at the same time contacting all portions of the spectacle lenses during such movement.

Disposed along and fitted in slidable relation to the closed marginal portion 12 of the envelope member is the U-shaped manually actuatable member 19. This member 19 is secured to the lens cleaning elements 16 and 16a so that the member 19 and the lens cleaning elements are movable as a unit longitudinally with respect to the envelope member and the lenses of a spectacle frame disposed between the lens cleaning elements. In the embodiment shown in Figs. 1 to 3 the securing means consists of rivets 20 by which the bottom of the U-shaped member 19 is secured to the curved marginal part 18, the spacer 21 being disposed between the member 19 and the part 18 so that both the U-shaped member 19 and the lens cleaning elements 16 and 16a will be freely slidable relatively to the envelope member 10 and longitudinally relative thereto. Such longitudinal movement is permitted by elongated slot 22 in the marginal portion 12 of the envelope member.

The spectacle case shown and described in connection with Figs. 1 to 3 is of very economical construction and is capable of ready assembly. Thus each of the elements which provide the envelope member 10, the lens cleaning elements 16 and 16a and the manually actuatable member 19 can be made from suitable sheet material such as metal or plastic and shaped as shown in Fig. 3. The lens cleaning material 17 may be secured to the lens cleaning elements by a suitable adhesive. The parts may then be assembled simply by nesting them together and securing the manually actuatable member to the lens cleaning elements by the rivets 20.

The manner of use of the spectacle case of this invention is believed to be apparent from the foregoing description. When it is desired to place spectacles therein this can be done very readily by slipping the spectacle frame therein and folding the temples over the portion 11a of the envelope member 10 as shown in Fig. 1. When in this position the spectacle frame and the lenses therein are effectively protected and the spectacles as thus placed in the case can be placed in one's pocket without danger of breakage. When it is desired to use the spectacles again the lenses thereof can be quickly and effectively cleaned by holding the envelope member 10 in one hand and moving the manually actuatable member 19 within the limits of movement permitted by the apertures or slots 22. When this is done the lens cleaning elements and the lens cleaning material are moved therewith and because the spectacle frame is prevented from substantial longitudinal movement relative to the envelope member the lens cleaning material is rubbed across the lenses of the spectacles throughout the extent thereof thereby removing dust, finger prints or other dirt or soil from the surface of the lenses. When the envelope member possesses limited resilient flexibility a slight amount of pressure may be applied to press the lens cleaning material presented by the lens cleaning elements against the lenses of the spectacle frame during manual movement of the parts in the manner stated. After the lenses of the spectacles have thus been cleaned the spectacles can easily be removed from the case and are ready for immediate use.

In Figs. 4 and 5 there is shown an alternative embodiment of the invention. In this embodiment the envelope member, the lens cleaning elements and the manually actuatable member are shown as being essentially the same as in Figs. 1, 2 and 3 and the corresponding parts have been indicated by like reference characters. The principal difference as compared with the embodiment shown in Figs. 1, 2 and 3 resides in securing means for securing the manually actuatable member 19 to the lens cleaning elements 16 and 16a. According to the embodiment shown in Figs. 4 and 5 the securing means consists of the rivets 22 which secure the portions of the U-shaped member 19 that overlie lens protecting portions 11 and 11a of the envelope member to the lens cleaning elements 16 and 16a respectively with the spacer members 23 and 23a therebetween so as to provide strength and rigidity while likewise providing sufficient clearance so that there will be no binding against the surfaces of the lens protecting portions 11 and 11a of the envelope member. In the embodiment shown in Figs. 4 and 5 the recess 14 in the lens protecting portion 11a is sufficiently deep to accommodate the spacer member 23a and likewise is of sufficient width relative to the shorter extent of the spacer member 23a for permitting the desired amount of movement of the member 19 and the lens cleaning elements 16 and 16a relative to the envelope member. Similarly the spacer member 23 is located in a slot in the lens protecting portion 11 whose longitudinal extent corresponds to the width of the recess 14. While in the embodiment shown in Figs. 4 and 5 the lens cleaning elements 16 and 16a are integral parts of the sheet material that also includes the portion 12, it is apparent that such construction is not essential and that the portion 12 can be omitted, the lens cleaning elements in such case being formed separately and respectively secured to the member 19 by the rivets 22.

The lens cleaning material 17 presented by the lens cleaning elements 16 and 16a may be composed of any suitable material such as soft or pile fabric, felted fibers, etc., and may be chemically treated, if desired, with known materials such as those that have heretofore been used for application to paper fabric, and the like intended for cleaning lenses.

I claim:

1. A spectacle case comprising a protective envelope member having lens protecting portions maintained in spaced-apart relation by a closed marginal portion, the opposite margin being open for receiving a spectacle frame between said lens protecting portions and at least one of said portions being centrally recessed from said open margin to receive the nose rest part of the spectacle frame, lens cleaning elements presenting lens cleaning material disposed between said lens protecting portions, means for maintaining said lens cleaning elements in proximate spaced relation for providing contact between said lens cleaning material and the lenses of a spectacle frame inserted therebetween, a manually actuatable member disposed outside of said envelope member along and adjacent said closed marginal portion thereof and securing means extending from the exterior to the interior of said envelope member for securing said manually actuatable member to said lens cleaning elements, said manually actuatable member, said securing means and said lens cleaning elements being carried by said envelope member for movement as a unit relative to said envelope member and to the lenses of a spectacle frame disposed between said lens cleaning elements for cleaning said lenses responsive to manual actuation of said manually actuatable member.

2. A spectacle case according to claim 1 wherein the longitudinal extent of said lens protecting portion of said envelope member which is recessed to receive the nose rest portion of a spectacle frame is approximately the same as the normal spacing of the inner surfaces of the temples of a spectacle frame so that said temples can be folded over said lens protecting portion and so that the spectacle frame when inserted between said lens protecting portions will be restrained from substantial movement relative to said envelope member when said manually actuatable member is moved to cause movement of said lens cleaning elements relative to said envelope member.

3. A spectacle case comprising an envelope member having opposed spaced-apart lens protecting portions of deformation-resisting sheet material which are adapted to protect the lens of a spectacle frame disposed therebetween and having a closed longitudinally disposed marginal portion integral with said lens protecting portions and composed of said sheet material, the opposite margin of said envelope member being open for receiving a spectacle frame therebetween and one of said lens protecting portions being recessed from said open margin for accommodating the nose rest portion of the spectacle frame, lens cleaning elements presenting opposed surfaces of lens cleaning material which are disposed between said lens protecting portions of said envelope member in movable relation thereto, means for maintaining said lens cleaning elements with the surfaces thereof presenting said lens cleaning material in resilient pressure contact with the lenses of a spectacle frame disposed therebetween, a manually actuatable member on the exterior of said envelope member fitted in longitudinally slidable relation about said closed marginal portion of said envelope member and substantially overlying part of said lens protecting portions so that it can be readily grasped, and securing means for securing said manually actuatable member to said lens cleaning elements for movement of said lens cleaning elements responsive to movement of said manually actuatable member, said envelope member being apertured for passage of said securing means therethrough with clearance permitting substantial movement of said manually actuatable member, said securing means and said lens cleaning elements longitudinally with respect of said envelope member and to the lens of a spectacle frame disposed between said lens cleaning elements.

4. A spectacle case comprising an envelope member composed of deformation-resisting material and comprising lens protecting portions maintained in spaced apart relation for receiving a spectacle frame therebetween, lens cleaning elements presenting lens cleaning material disposed between said lens protecting portions of said envelope member in movable relation thereto, means for maintaining said lens cleaning elements in spaced-apart relation for insertion of a spectacle frame therebetween with contact between the lenses of said spectacle frame and the lens cleaning material presented by said lens cleaning elements, a manually actuatable member disposed externally of said envelope member in longitudinally slidable relation thereto, and securing means rigidly connecting said manually actuatable member to said lens cleaning elements for movement of said lens cleaning elements responsive to longitudinal movement of said actuating member, said securing means passing through openings in said envelope member having substantially greater longitudinal extent than said securing means for permitting substantial longitudinal movement of said manually actuatable member and said lens cleaning elements relative to said envelope member.

KENDRICK T. PARSELL.

References Cited in the file of this patent

UNITED STATES PATENTS

| Number | Name | Date |
|---|---|---|
| 636,176 | Purdy | Oct. 31, 1899 |
| 1,091,396 | Serres | Mar. 24, 1914 |
| 1,240,880 | Rink | Sept. 25, 1917 |
| 1,842,599 | Fraser | Jan. 26, 1932 |
| 2,274,591 | Daniel | Feb. 24, 1942 |